M. SCHMITT.
QUACK GRASS DIGGER.
APPLICATION FILED NOV. 25, 1910.

1,124,534.

Patented Jan. 12, 1915.

2 SHEETS—SHEET 1.

WITNESSES

INVENTOR
MATHIS SCHMITT
ATTORNEYS

M. SCHMITT.
QUACK GRASS DIGGER.
APPLICATION FILED NOV. 25, 1910.

1,124,534.

Patented Jan. 12, 1915.

2 SHEETS—SHEET 2.

WITNESSES

INVENTOR
MATHIS SCHMITT
ATTORNEYS

UNITED STATES PATENT OFFICE.

MATHIS SCHMITT, OF AUSTIN, MINNESOTA.

QUACK-GRASS DIGGER.

1,124,534.   Specification of Letters Patent.   Patented Jan. 12, 1915.

Application filed November 25, 1910. Serial No. 594,123.

*To all whom it may concern:*

Be it known that I, MATHIS SCHMITT, of Austin, Mower county, Minnesota, have invented certain new and useful Improvements in Quack-Grass Diggers, of which the following is a specification.

The object of my invention is to provide a machine of simple, durable construction which will effectually tear or pull up the quack grass with which many of the farms in certain sections of the West are infested.

A further object is to provide a machine composed of comparatively few parts and one which will be economical to manufacture and maintain.

My invention consists generally in various constructions and combinations, all as hereinafter described and particularly pointed out in the claims.

Figure 1:
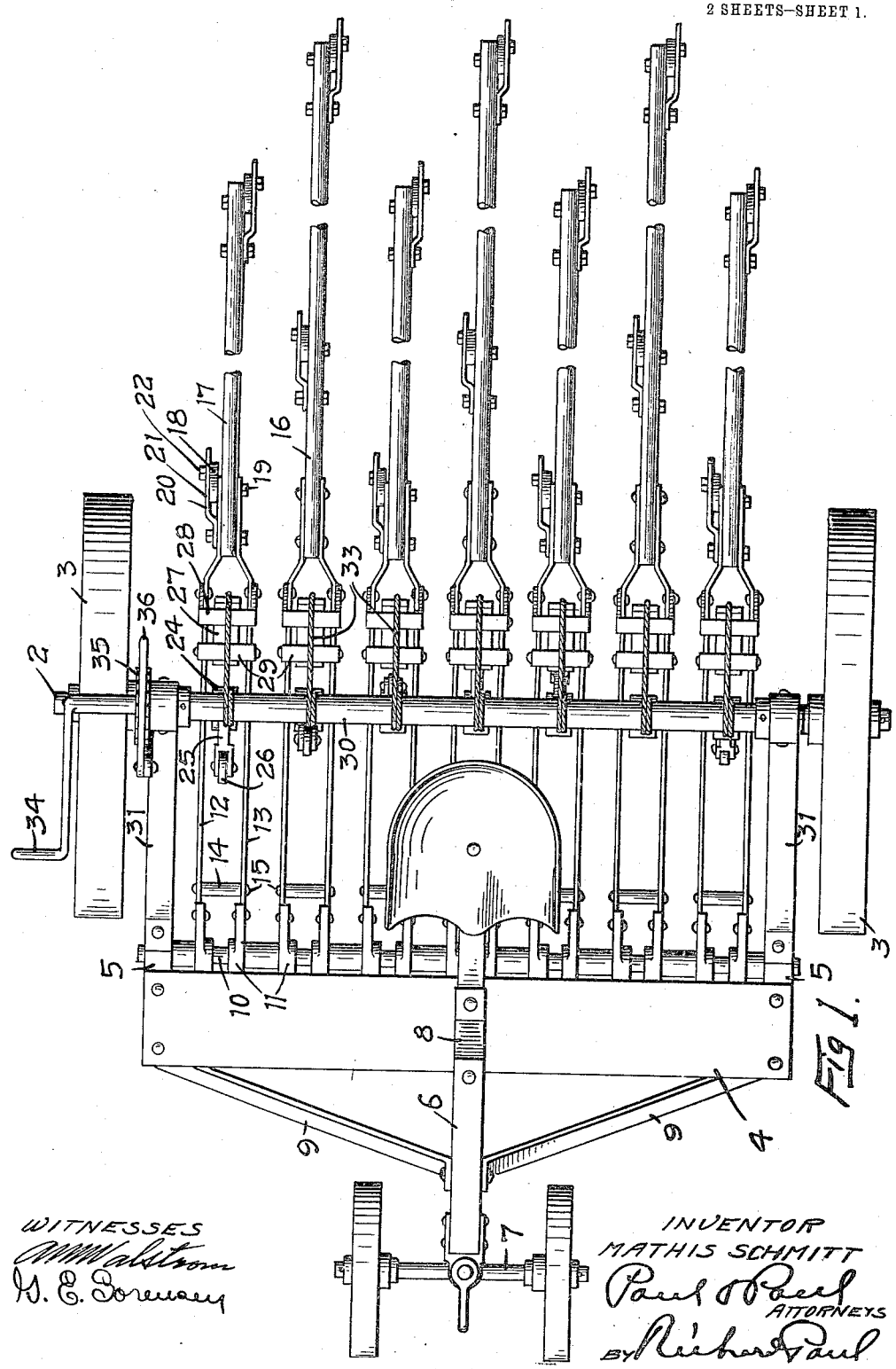
Figure 2:
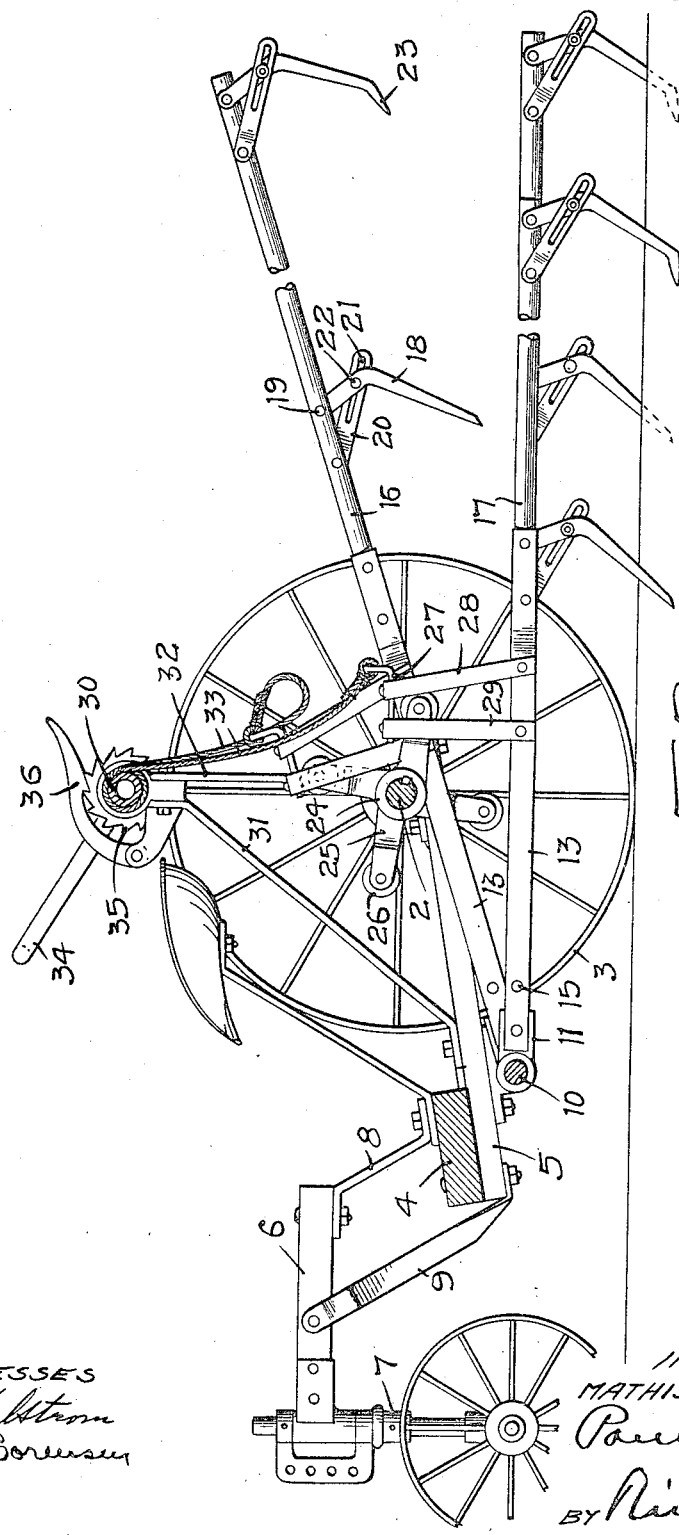

In the accompanying drawings forming part of this specification, Figure 1 is a plan view of a quack grass machine embodying my invention, Fig. 2 is a longitudinal sectional view of the same.

In the drawing, 2 represents the axle of the machine having carrying wheels 3.

4 is a cross bar connected at each end with the axle by side rails 5.

6 is a forwardly extending pole section mounted on a truck 7 and connected with the cross bar 4 by straps 8 and 9.

A rod 10 is mounted on the underside of the rails 5 and extends transversely of the machine, and castings 11 are journaled on said rod and secured to the forward ends of the straps 12 and 13 arranged in parallel relation with one another and extending backwardly under the axle 2 and having separating sleeves 14 mounted on bolts 15. The rear ends of the straps 12 and 13 are bent inwardly toward one another and secured to the forward ends of a series of bars 16 and 17. The bars 16 are preferably longer than the bars 17 and upermit the convenient mounting of the grass cutting and digging knives thereon in staggered relation to one another, as indicated in Fig. 1. These knives, the shape of which is shown plainly in Fig. 2, are designed to dig into the soil a sufficient distance to uproot or tear out the quack grass so that a large section of land infested with this grass can be thoroughly cleared in a comparatively short space of time.

I prefer to employ two forms of knives, the first of which I will designate by the reference numeral 18, preferably angular in form, pivoted at its upper end, as at 19, on a supporting bar and having a straight lower portion terminating in a pointed end that is adapted to dig into the soil and cut or tear the grass roots. These knives are held in their working position and are made capable of adjustment by means of links 20 having slots 21 therein in which bolts 22 mounted on the knives are slidable, means being provided for tightening the bolts sufficiently to hold them against slippage in ordinary work, but permitting the bolts to slide in the slots and allow the knife to rise out of the ground in case it should strike a root, rock, or other obstruction which might break the knife if it was held rigidly. The adjustment of the bolts back and forth in the slots allows the angle of the knife with respect to the ground line to be changed, as indicated in Fig. 2, the extreme upper adjustment allowing the knives to skim along the surface of the ground while the slot is of sufficient length to allow the knife to be held in a vertical position so that it will dig in a considerable distance. The knives are preferably mounted on opposite sides of the drag bars so that they will not track with one another and will therefore cover more ground. The rear knives are preferably mounted in the same manner as those in the front, but each knife has a foot portion 23 that is flattened on the underside to restrict the digging tendency of the knives and act as a guide and hold the knives at a uniform depth in the soil.

The manner of mounting the supports for the knives at the forward end of the machine allows the bars to be swung vertically to clear the knives of the grass which may be dug out of the soil or any refuse which may have collected on the knives, and for the purpose of raising the bars successively I provide a series of hubs 24, one for each bar, mounted on the axle 2 and each provided with a radiating arm 25 carrying an anti-friction wheel 26. The arms are so arranged around the axle that the bars and knives will be raised successively.

Plates 27 are arranged in the path of the anti-friction wheels and are secured to the straps 12 and 13 by bails 28 and 29. The revolution of the arms, therefore, will swing each anti-friction wheel into contact with its plate 27 and lift the bar and the knives carried thereby until the anti-friction wheel clears itself of contact with the plate 27. The bar and the knives will then drop by gravity back upon the ground. The manner of mounting the plates may be varied and more than one arm may be mounted on a hub, if preferred.

I prefer to time the upward movement of the bars and locate the knives on the bars so that when the rear knife of a bar drops back upon the ground it will dig into the ground in the rear of the point where the forward knife left the ground when the bar was raised. This will effect a double digging of the knives or will result in one knife working over a portion of the ground through which the other knife has passed. This will result in a more effective clearing of the soil and a more complete removal of the quack grass and weeds. The number of knives may be varied, as seems desirable, and their shape may be changed to conform to the character of the soil in which the machine is used. I have found, however, the general lines of the knives shown in the drawings as best suited for general use. Various means may be employed for raising the bars and knives to an inoperative position, but I have shown a shaft 30 supported above the axle 2 by suitable means, such as the straps 31 and 32, and provided with flexible means such as cables 33 which connect said shaft with the ends of the plates 27. A crank 34 is mounted on one end of the shaft and a ratchet wheel 35 is secured to said shaft, having its teeth in engagement with a dog 36 by means of which the shaft may be locked when the bars are raised to their inoperative position. Upon reaching the work the operator will release the dog and allow the bars to drop until the knives contact with the ground.

The hubs 24 and the arms carried thereby operate between the straps 12 and 13 and the lifting strain is therefore applied centrally with respect to the drag bars, resulting in an even distribution of the strain and lessening the wear of the connections.

I do not wish to be confined in this application to the number of drag bars employed or the number of knives carried thereby, or the manner of supporting the knives, as I am aware that in various ways the details of construction may be modified without departing from my invention.

I claim as my invention:—

1. A machine of the class described comprising a frame having an axle and carrying wheels, a series of drag bars pivotally connected at their forward ends to said frame and extending backwardly in the rear of said axle, knives mounted on said bars and depending therefrom and having cutting edges at their lower ends adapted to enter the soil, there being several knives on each bar arranged one in front of the other, and the knives of each bar being in staggered relation to the corresponding knives of the adjacent bar, and means for intermittently lifting said bars and knives, the lifting of said bars being timed to allow the rear knife to engage the soil when a bar is dropped in the rear of the point where the forward knife left the soil upon the lifting of a bar.

2. A machine of the class described comprising a frame having an axle and carrying wheels, a series of drag-bars pivotally connected at their forward ends to said frame in front of said axle and below the level of the same and extending back horizontally beneath said axle, knives pivoted on said bars and depending therefrom and having cutting edges at their lower ends adapted to enter the soil, straps mounted on said bars near said axle and hubs secured to said axle and having arms adapted to engage said straps and lift said bars successively and intermittently.

3. A machine for digging quack grass comprising a frame having an axle and carrying wheels, a rod mounted in said frame transversely thereof in front of said axle and below the level of the same, a series of castings journaled on said rod, a series of straps secured at their forward ends to said castings and projecting rearwardly therefrom, said straps being arranged in pairs, bars secured to the rear ends of each pair of straps and projecting horizontally and rearwardly therefrom, knives mounted on said bars, bails mounted on said straps and means mounted on said axle and engaging said straps for lifting said bars successively.

4. A machine of the class described comprising a frame having an axle and carrying wheels, a series of drag bars pivotally connected to said frame and extending rearwardly therefrom, knives mounted on said bars and depending therefrom and having cutting edges adapted to enter the soil, some of said knives being mounted on one side of a bar and other of said knives being mounted on the opposite side of the same bar, and the knives of adjacent bars being mounted in staggered relation to one another, the pivots of said bars being in advance of said axle, and means mounted on said axle for lifting said bars successively.

5. A machine of the class described comprising a frame having an axle and carrying wheels, a series of drag bars pivotally connected to said frame and extending rearwardly, knives pivoted on said bars and depending therefrom and having cutting edges adapted to enter the soil, hubs mounted on said axle and having arms radiating therefrom, and means connected with said bars and located in the path of said arms to be actuated thereby, substantially as described.

6. A machine of the class described comprising a frame having carrying wheels therefor, a series of drag bars pivotally connected with said frame and extending rearwardly, knives mounted on each bar, one in front of another, and depending below said bars and having cutting edges adapted to enter the soil, and means for lifting and dropping said bars successively, the knives being so arranged on said bars and the lifting of the bars being timed to allow the rear knife to engage the soil when a bar is dropped in the rear of the point where the forward knife left the soil upon the lifting of a bar, for the purpose specified.

7. A machine of the class described comprising a frame having carrying wheels, a series of pivoted drag bars extending rearwardly with respect to said frame, said bars being parallel substantially with the ground line and adjacent thereto, a series of knives mounted on each bar, one in front of another, and having cutting edges adapted to enter the soil, means for raising and releasing said bars, the knives on said bars being positioned and the upward movement of said bars being timed to cause the rear knife of a bar to enter the soil when the bar is dropped in the rear of the point where the forward knife left the soil when the bar was raised.

In witness whereof, I have hereunto set my hand this 17th day of November, 1910.

MATHIS SCHMITT.

Witnesses:
A. W. WRIGHT,
MATTIE E. HOLLISTER.

Copies of this patent may be obtained for five cents each, by addressing the "Commissioner of Patents, Washington. D. C."